United States Patent
Nolten et al.

(10) Patent No.: US 7,063,611 B2
(45) Date of Patent: Jun. 20, 2006

(54) FILLETING SYSTEM FOR POULTRY

(75) Inventors: Eric Nolten, Oostzaan (NL); Johan Hendrik Anton Klukhuhn, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 142 days.

(21) Appl. No.: 10/795,130

(22) Filed: Mar. 5, 2004

(65) Prior Publication Data

US 2004/0235409 A1 Nov. 25, 2004

(30) Foreign Application Priority Data

Mar. 6, 2003 (NL) .................................. 1022858

(51) Int. Cl.
*A22C 21/00* (2006.01)

(52) U.S. Cl. ..................................... 452/160

(58) Field of Classification Search ................. None
See application file for complete search history.

(56) References Cited

U.S. PATENT DOCUMENTS

| | | |
|---|---|---|
| 4,557,015 A | 12/1985 | Dodd |
| 4,589,165 A | 5/1986 | Lerner et al. |
| 4,648,156 A | 3/1987 | Meyn |
| 4,682,386 A | 7/1987 | Hazenbroek et al. |
| 4,993,114 A * | 2/1991 | Meyer et al. ................ 452/136 |
| 5,045,022 A * | 9/1991 | Hazenbroek ................ 452/165 |
| 5,269,722 A * | 12/1993 | Diesing et al. .............. 452/135 |
| 5,312,291 A * | 5/1994 | van den Nieuwelaar et al. ........................... 452/165 |
| 5,407,383 A * | 4/1995 | Diesing et al. ............. 452/169 |
| 5,466,185 A | 11/1995 | Martin et al. |
| 5,492,503 A | 2/1996 | Davis |
| 5,545,083 A * | 8/1996 | Bargele et al. ............. 452/136 |
| 5,643,074 A | 7/1997 | Linnenbank |
| 5,827,116 A | 10/1998 | Al et al. |
| 5,833,527 A * | 11/1998 | Hazenbroek et al. ....... 452/170 |
| 6,007,416 A * | 12/1999 | Janssen et al. ............. 452/135 |
| 6,142,863 A * | 11/2000 | Janssen et al. ............. 452/165 |

OTHER PUBLICATIONS

Search Report—Issued by EPO, Nov. 18, 2003.
EPO Search Report, Apr. 21, 2005.

* cited by examiner

*Primary Examiner*—Thomas Price
(74) *Attorney, Agent, or Firm*—Dority & Manning (57) ABSTRACT

A filleting system for poultry, such as chickens, includes a conveyor system incorporating carriers for the poultry. Processing stations are provided in or along the path of the conveyor system for successively processing parts of the poultry, wherein the processing stations include at least one skinner, one wishbone remover, a fillet scraper, and either a breastbone scraper or a cutter for halving breast fillets.

18 Claims, 10 Drawing Sheets

FILLETING SYSTEM FOR POULTRY

FIELD OF THE INVENTION

The invention relates to a filleting system for poultry, such as chickens, comprising a conveyor system incorporating carriers for the poultry, with processing stations being provided in or along the path of the conveyor system for successively processing parts of the poultry. Such a filleting system is known from U.S. Pat. No. 4,682,386.

BACKGROUND

In the known filleting system, the poultry from which the legs and wings have been removed and which has previously been eviscerated, is placed on horizontally disposed carriers and is subsequently, in an upside down position, conveyed by the conveyor system along a number of processing stations for the removal of meat parts from the carcass. In order to ensure that the poultry placed upon the carriers cannot fall off during the processing to be carried out, the known apparatus is embodied with a separate guide rail supporting the poultry.

SUMMARY OF THE INVENTION

It is one of the objects of the invention to render the known filleting system suitable for various operations that are in better agreement with the necessary halves.

Another object of the invention is to improve the quality of the product obtained with the filleting system.

Still another object is to provide a filleting system that is constructed more simply and which aptly utilizes the natural forces present, in particular the gravitational force.

These and other objects of the invention, which may be set forth in the following description, or obvious from the description, or learned through practice of the invention, are realized in a filleting system that is characterized by one or several of the appended claims.

In a first aspect of the invention, the filleting system, which comprises a number of processing stations in or along the path of the conveyor system, is characterized in that said processing stations are selected from the group comprising at least one skinner, one wishbone remover, one fillet scraper, one breastbone scraper and a cutter for halving breast fillets. These system components make an automated production possible of breast fillets or breast fillet halves, while avoiding any decline of the quality aspects of the breast fillets or breast fillet halves to be obtained and as much as possible limiting wastage. In particular, it was shown to be possible in such a filleting system to avoid the occurrence of bone splinters, while it is also possible to realize a high meat yield.

For the adequate operation of the filleting system according to the invention, it is desirable that the carriers for the poultry be disposed vertically and be coupled to the side of the conveyor system. Thanks to this arrangement, the meat that during the respective operations is attached to, or that due to gravitation hangs from the carcass, will tend to become positioned such that the operations can be carried out adequately and effectively. This will be further clarified below. An additional advantage of this measure is that the filleting system can be embodied without separate support means for the poultry that is placed on the carriers.

To be able to optimally utilize the above-mentioned advantage of the gravitational force aiding the processing of the poultry, it is preferred for the carriers to be rotatably coupled with the conveyor system such that the poultry placed upon the carriers can be repositioned from a first position, with the neck of the poultry being directed downward, to a second position, in which the poultry is substantially horizontal, and a third position wherein the neck of the poultry is directed upward.

Although the explanation to be given below relates substantially to the processing of breast caps, the system is also useful for the processing of front halves. If necessary, a slightly different carrier with an adapted clamp mechanism and a different fixing procedure may be used. The breast caps are then fixed with the wing joints downward and the sternum upward. The front halves are fixed with the wing hinges upward and the sternum downward.

The first position of the carriers was proven to be very suitable for breast caps, allowing the poultry to be placed upon the carriers effectively and reliably, while the second position and the third position are generally (in other words also for front halves) suitable for very effectively carrying out certain operations on the poultry.

For example, when the carriers pass the skinner, they are preferably in the second position such that the sternum of the poultry placed upon the carriers is oriented in the conveyor system's direction of transport, and the skinner operates from the sternum in the direction of the wing hinges for the removal of the skin from the poultry. Any blisters that may be on the poultry, are thus removed at the same time.

When skinning the front halves, a skin scorer may optionally be provided at the side or at the dorsal side to aid the removal of the skin.

In a further aspect according to the invention, the filleting system is characterized in that along the path of the conveyor system, the carriers pass sections at predetermined adjustable section velocities, such that the velocity at which the carriers pass the processing stations can be optimized for each processing station. This allows the operation carried out by the various processing stations in the path of the conveyor system to be exactly adjusted to the distance the carriers have to assume when passing the respective processing stations, without comprising the processing velocity of the filleting system as a whole. After all, when the carriers are in the second position the distance between the carriers needs to be greater than when the carriers are in the third position.

A very important novelty of the filleting system according to the invention is that the wishbone remover is designed to twist the wishbone out of the shoulder joint of the poultry completely and without fracture. The occurrence of bone splinters and their being left behind in the fillet is thereby avoided, while at the same time any meat still left on the wishbone can be effectively recovered, which may also result in a higher return.

It is pointed out that the Dutch patent application 8402165 (U.S. Pat. No. 4,648,156) discloses an apparatus for the removal of a wishbone from poultry, which is characterized in that the apparatus possesses a cutting member for the removal of the top of the wishbone. The present invention provides a further improvement in reducing the risk of bone splinters in the fillet.

In order to optimally utilize the gravitational force so as to economize on system parts, it is preferred that when the carriers pass the wishbone remover, they are in the third position and that the wishbone is moving away from the respective carrier.

It has further been shown to be advantageous for the wishbone remover and the fillet scraper to operate simultaneously and in a manner attuned to each other. In this way it is possible to allow the interior fillet and the exterior fillet of the poultry to remain connected so as to obtain a fillet of higher quality.

This may be achieved in particular in a filleting system wherein the wishbone remover comprises a gouging member and a shearing blade, wherein the gouging member is inserted into the poultry from the top, between the shoulder joints and the wishbone, and wherein the shearing blade is positioned at the breast side of the poultry and is able to cut the poultry underneath the wishbone and underneath a lowest position of the gouging member.

It is further desirable for the fillet scraper to comprise two scraping members, which during use are positioned at both sides of the carcass of the poultry that is placed on a carrier and which are movable vertically along said carcass.

In order to achieve the above described objective, it is in accordance with a further aspect of the invention at least desirable that during use, the gouging member and the scraping members, approximately simultaneously or successively, make a downward movement causing a portion of the fillet to come loose from the carcass while the gouging member enters the poultry between the shoulder joints and the wishbone.

It is useful that before the downward movement of the scraping members commences, said scraping members will in their highest position move towards each other over a predetermined distance. This achieves that the scraping members enter the poultry just below the wing joints (seen in the vertical direction) and between the wing joints and the breast fillet (seen in the horizontal direction) with the result that the breast meat still remains slightly attached to the wing joints after the wishbone has been removed in the manner to be described below and after the first scrapers have done their work.

It is further advantageous that before the gouging member reaches a lowest position, the scraping members move slightly upward to reduce the pressure on the wishbone.

The combined movement of the gouging member and the scraping members results, viewed in the plane of the wishbone, in the ends of the wishbone being pushed towards each other, without detriment to the yield of breast fillet, while reducing the risk of a portion of the wishbone being left in the breast fillet.

The removal of the wishbone from the poultry is initiated because after the gouging member reaches its lowest position, said gouging member moves over a predetermined distance away from the carrier of the poultry.

The wishbone is eventually removed due to the fact that the shearing blade makes a to and fro movement in the direction of, and subsequently away from, the carrier of the poultry, this movement commencing after the gouging member has reached its lowest position. As the shearing blade moves away, the gouging member moves in the same direction so that the wishbone is twisted out of the shoulder joints.

Advantageously, approximately at the moment of the carrier being moved away by the shearing blade and the gouging member, the scraping members continue their downward movement, further loosening the breast fillet from the carcass.

The described manner of removing the wishbone from the poultry allows the meat still remaining on the wishbone to be recovered with better results than when recovering it as part of the whole carcass. This may be attributed to the fact that the meat/bone ratio of the wishbone with remaining meat is much more favourable than that of the remaining carcass.

For the operationally safe removal of the wishbone in the above referred-to manner, it is desirable for the gouging member, as seen from its point, to extend in a bowl shape designed to receive the wishbone.

Due to the above-described operation by the wishbone remover and the fillet scraper, the breast fillet is now only connected to the breastbone, hanging downward from the carcass. Optionally, the breast fillet may at this point be portioned with the aid of the cutter for halving the breast fillets so as to obtain two breast fillet halves.

To this end it is desirable for the carriers to be in the second position when they pass the cutter for halving the breast fillets.

The cutter for halving the breast fillets is suitably embodied such that it comprises two rotating knives disposed at such proximity to each other that they make an incision into the meat at both sides of the breastbone. In this situation the breastbone scraper does not need to come into operation.

When recovering whole breast fillets, it is desirable that in a following operation the breastbone scraper comes into action, which is characterized in that the same is designed as an elongated blade disposed longitudinally, corresponding to or parallel to the conveyor system's direction of transport, and that in a cross sectional view this blade is round and adapted to the curve of the breastbone of the poultry, with the carrier being in the third position when passing the breastbone scraper.

Although the position of the curve of the breastbone in poultry varies continually, the shape of this breastbone is substantially constant and the breast fillet can be reliably and effectively separated from the breastbone, using a breastbone scraper designed in accordance with the invention.

Hereinbelow the invention will be further elucidated by way of a non-limiting exemplary embodiment and with reference to the drawing.

BRIEF DESCRIPTION OF THE DRAWINGS

The drawings show in.

Similar components in the figures carry identical reference numbers.

DETAILED DESCRIPTION

Reference is now made to embodiments of the invention, one or more examples of which are shown in the drawings. The embodiments are presented by way of explanation of the invention, and not as a limitation of the invention. The invention includes modifications and variations to the embodiments described herein.

Figure 1:
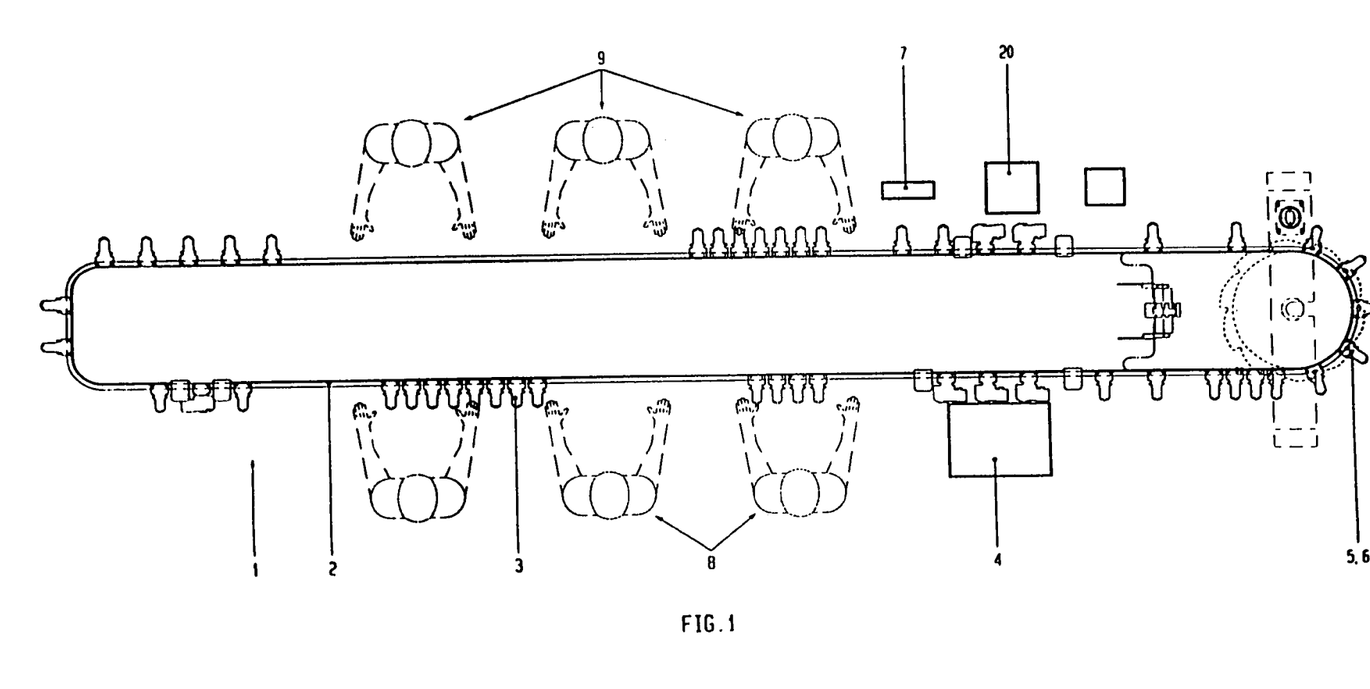
FIG. 1: a top view of the filleting system according to the invention.

Referring first to FIG. 1, a top view is shown of a complete filleting system 1 for poultry, in particular for chicken. This filleting system 1 includes a conveyor system 2 comprising carriers 3 upon which poultry can be placed.

In or along the path of the conveyor system 2, there are various processing stations for the successive removal of parts of the poultry. These processing stations may include a skinner 4, a wishbone remove 5, a fillet scraper 6 and a breastbone scraper 7. This is not an exhaustive but an enuntiative account; as a further example a cutter 20 for halving the breast fillets in the filleting system may also be included.

In the filleting system shown, both the fixing and the removal of the carcasses is carried out manually by operators 8 and 9, respectively. However, this is not essential. The invention also includes an embodiment wherein the fixing and removal of (parts of) the carcasses is automated. In a fully automated version, the production capacity of the filleting system can be increased, while the absence of visual and manual (touch) control comprises the quality of the recovered breast fillets only slightly.

In contrast with the arrangement known from U.S. Pat. No. 4,682,386, the carriers 3 for the poultry are placed vertically and coupled to the side of the conveyor system 2. This facilitates among other things the quick and effective fixing of the poultry by the operating personnel 8.

The carriers 3 are preferably rotatably coupled with the conveyor system 2, such that the carriers 3 are at least adjustable between a first position wherein the neck of the poultry is directed downward (the fixing position), a second position in which the poultry is disposed substantially horizontally and on its side (this position is especially convenient for skinning) and a third position in which the neck of the poultry is directed upward (this is the preferred position for removing the wishbone and for the actual recovery of the breast fillets).

In order to achieve a sufficiently high production capacity in such a situation, it is desirable for the carriers on the path of the conveyor system to pass sections at predetermined adjustable section velocities such that the velocity at which the carriers pass the processing stations can be optimized for each processing station. Manual fixing of the poultry may then occur without haste, while in addition achieving that the distance of the carriers attuned to the processing stations can be varied in concurrence with the horizontal or vertical position in which said carriers 3 are preferably to be disposed.

When the carriers 3 pass the skinner 4 they are in the second position, such that the sternum of the poultry placed on the carrier is oriented in the transport direction of the conveyor system 2, allowing the skinner 4 to operate to remove the skin of this poultry from the sternum in the direction of the wing hinges. For this skinning, skinners may be used with which the person skilled in the art is familiar, for example, skinners provided with cylinders rotating in opposite directions, provided with spiral grooves that engage the skin.

Figure 2:
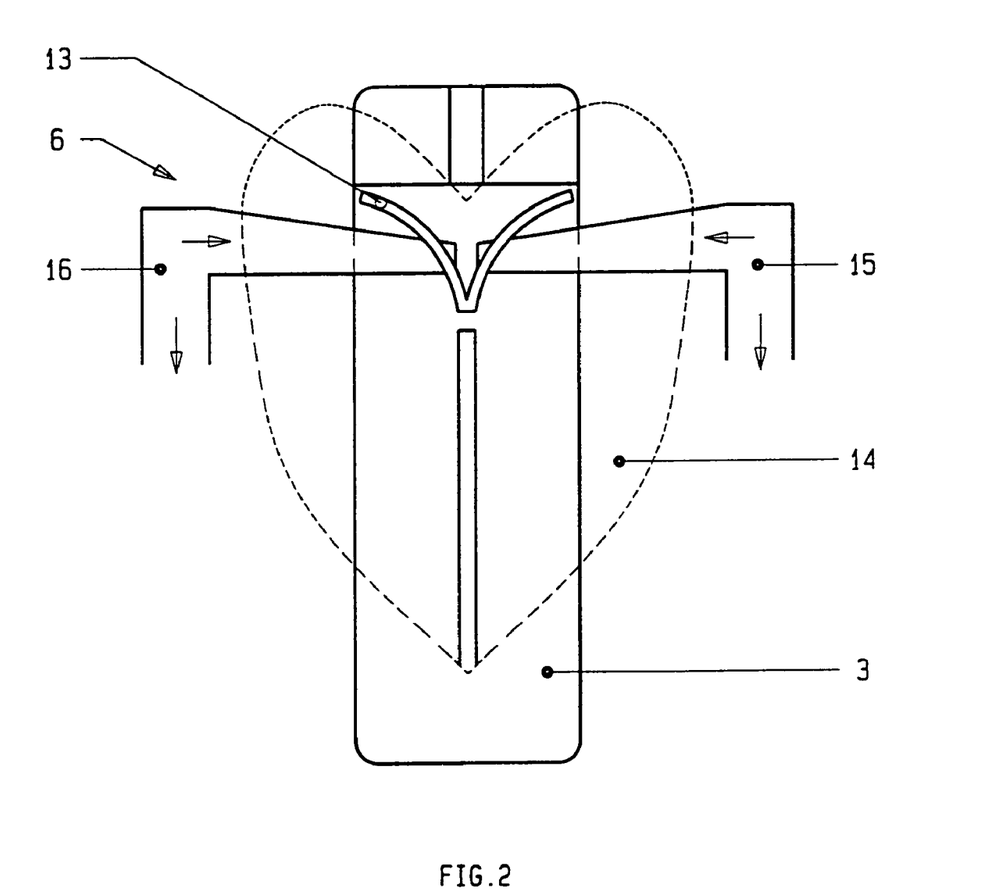
FIG. 2 to
FIG. 8: a number of consecutive operational stages of the wishbone remover and fillet scraper as arranged in the filleting system according to the invention.
Figure 3:
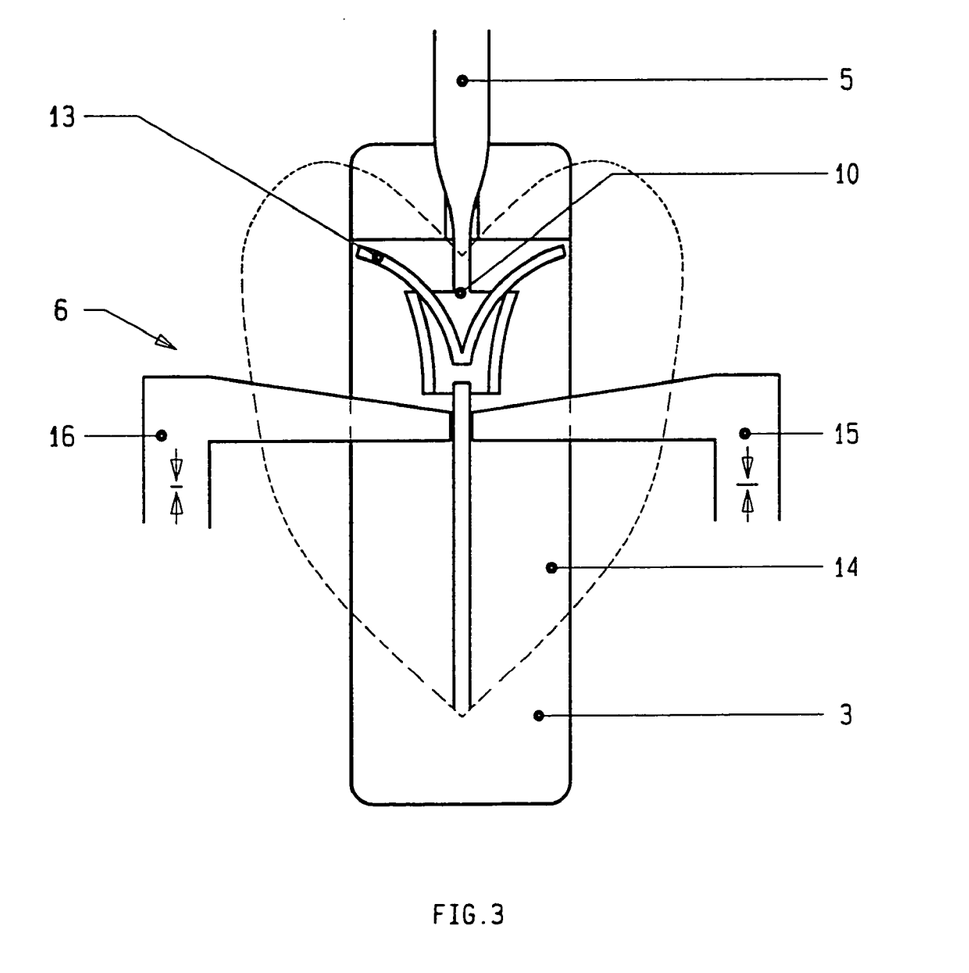

Referring now further to FIGS. 2 and 3, the working of the wishbone remover 5 and the fillet scraper 6 will be elucidated. It should first be noted, that when the carriers 3 of the poultry pass the wishbone remover 5, they are in the third position and that the wishbone moves away from the respective carrier. The reason for this will become clear from the following. It is also noted that the wishbone remover 5 and the fillet scraper 6 operate simultaneously and in concord.

The wishbone remover 5 comprises a gouging member 10 as shown in a front view in FIG. 3 and in FIG. 4 to FIG. 8 in a side view. The wishbone remover 5 also comprises a shearing blade 11 as shown in the FIGS. 6, 7 and 8.

Figure 4:
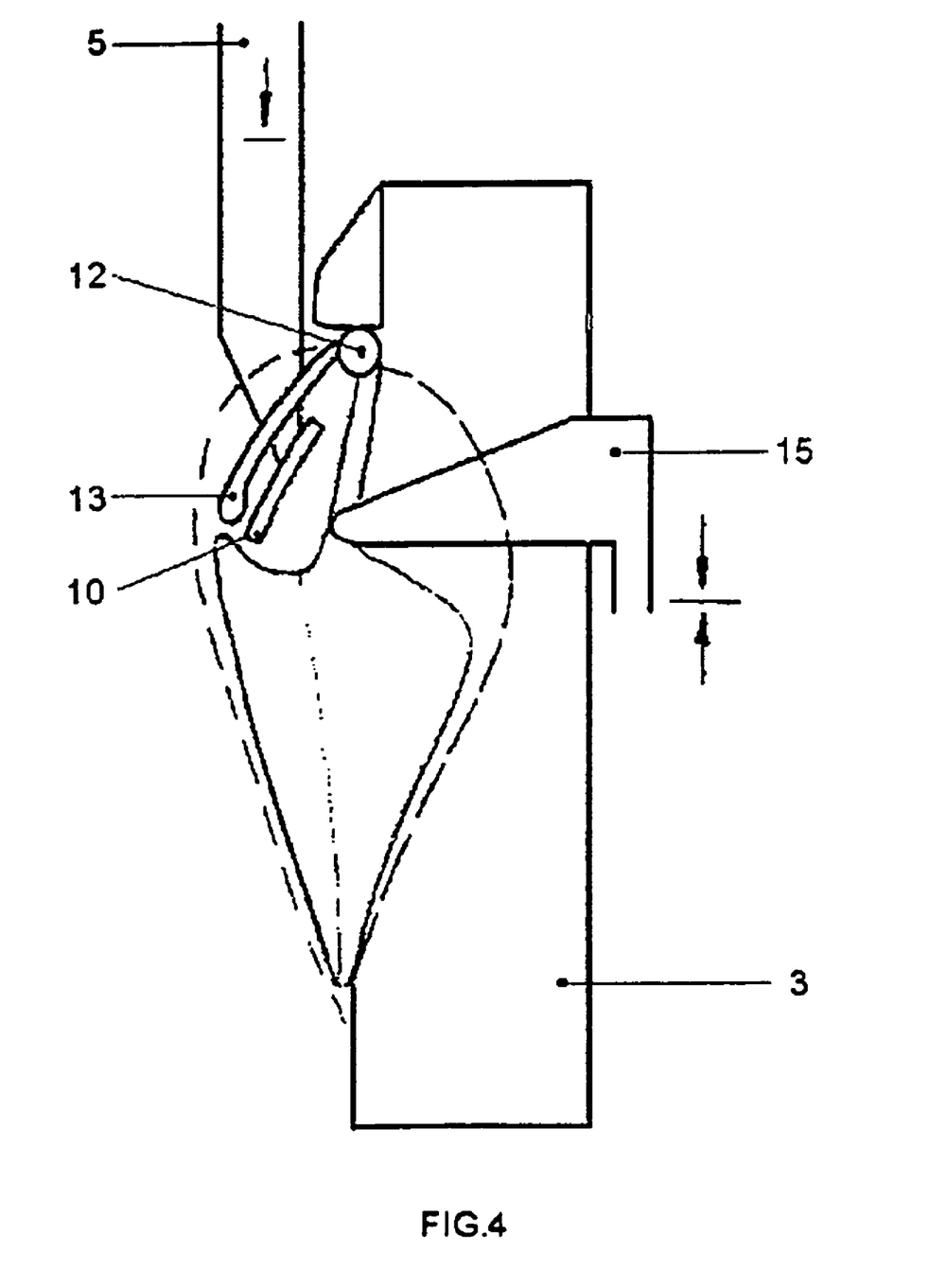

The gouging member 10 is inserted from the top into the poultry between the shoulder joints 12 and the wishbone 13 of the poultry (see FIG. 4).

Figure 7:
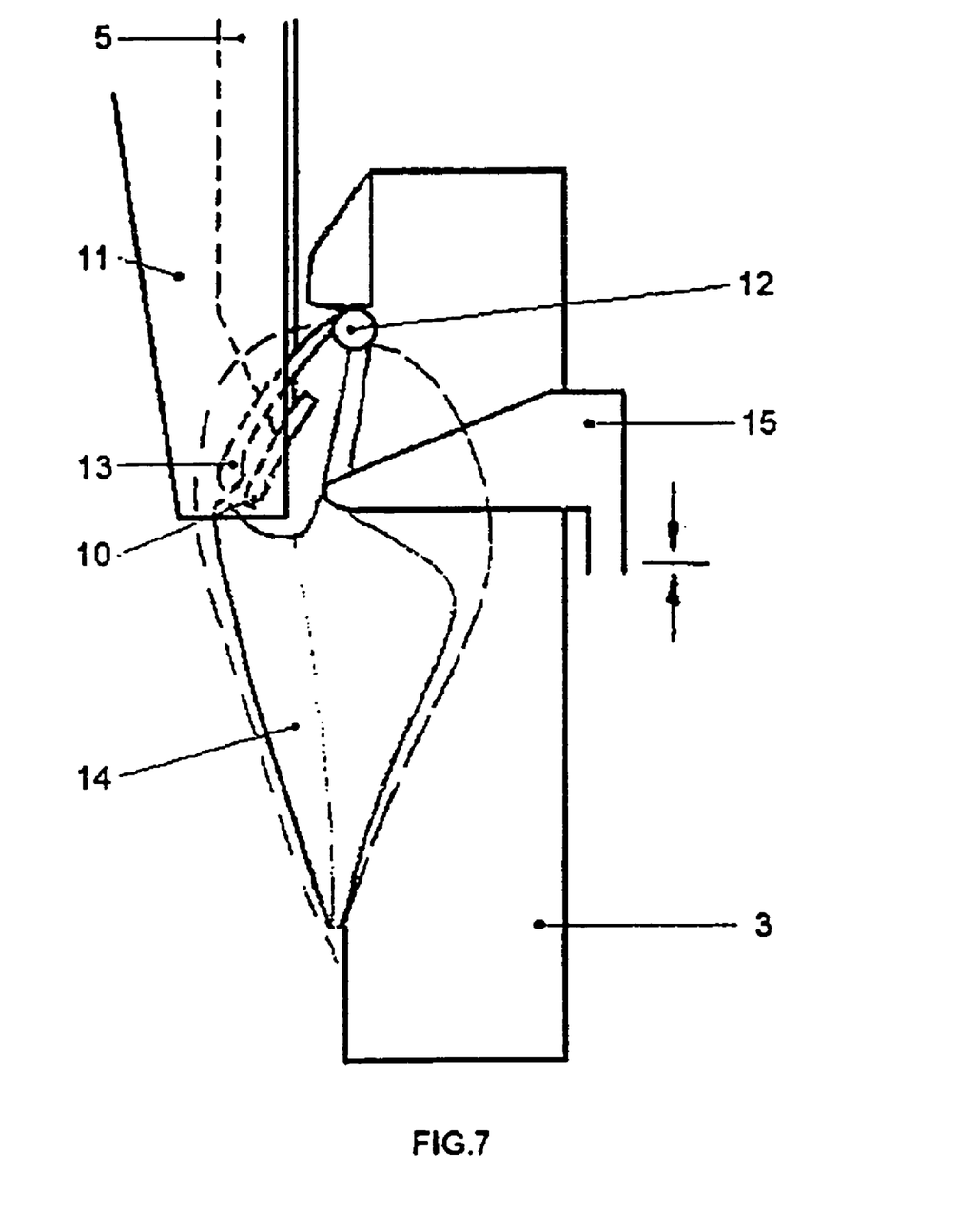

As shown in FIG. 7, the shearing blade 11 is placed to the breast side of the poultry 14 and is able to cut the poultry 14 under the wishbone 13 and under a lowest position of the gouging member 10.

The FIGS. 2 to 8 further show clearly that two scraping members 15, 16 are provided that form part of the fillet scraper 6 and that during use are positioned at both sides of the poultry 14 placed on a carrier 3 (see the FIGS. 2 and 3) and are vertically movable along said poultry 14.

The combined working of the wishbone remover 5 and the fillet scraper 6 is as follows.

FIG. 2 shows that the scraping members 15, 16 initially make a downward movement to loosen the meat at the top side from the carcass of the poultry 14. To this end, the scraping members 15, 16 move in their top position first toward each other, such that they enter the poultry just below the wing joints (viewed in vertical direction) between the wing joints and the breast fillet (viewed in horizontal direction), after which the downward movement commences. This results in the breast meat remaining slightly attached to the wing joints after the wishbone has been removed and after the first scrapers have done their work.

FIG. 3 shows that immediately thereafter, the gouging member 10 is inserted into the top side of the poultry 14 and lodges under the wishbone 13 and above the shoulder joint 12; FIG. 4 shows the position of the gouging member 10 after completing this repositioning.

Figure 5:
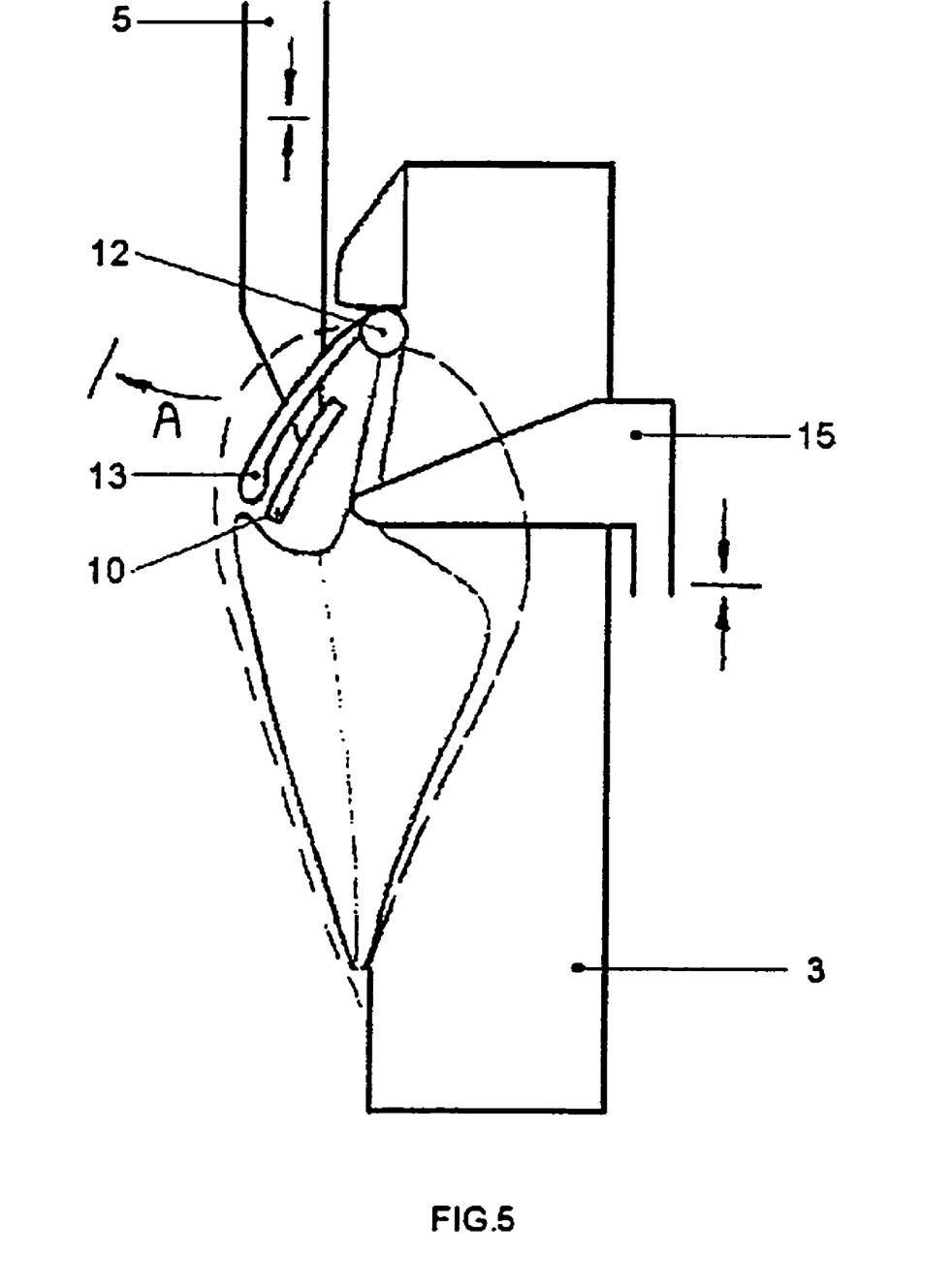

FIG. 5 shows that after reaching the lowest position, the gouging member 10 is moved over a predetermined distance in the direction of arrow A away from the carrier 3 of the poultry, causing some pressure to be exerted upon the wishbone 13. The scrapers 15, 16 maintain their position.

Incidentally, it should be noted that it is advantageous to move the scraping members 15, 16 slightly upward before the gouging member 10 undergoes the just-described repositioning, so as to create room for the displacement of the wishbone 13 in connection with the pressure referred to.

For the benefit of the above-described repositioning causing pressure to be exerted upon the wishbone 13, attention is drawn to the fact that the gouging member 10, from its lowest point and viewed from the front, is on both sides bowl shaped, so as to operationally safely receive the wishbone therein. This provides the certainty that the repositioning of the gouging member 10 will result in a corresponding repositioning of the wishbone 13.

Figure 6:
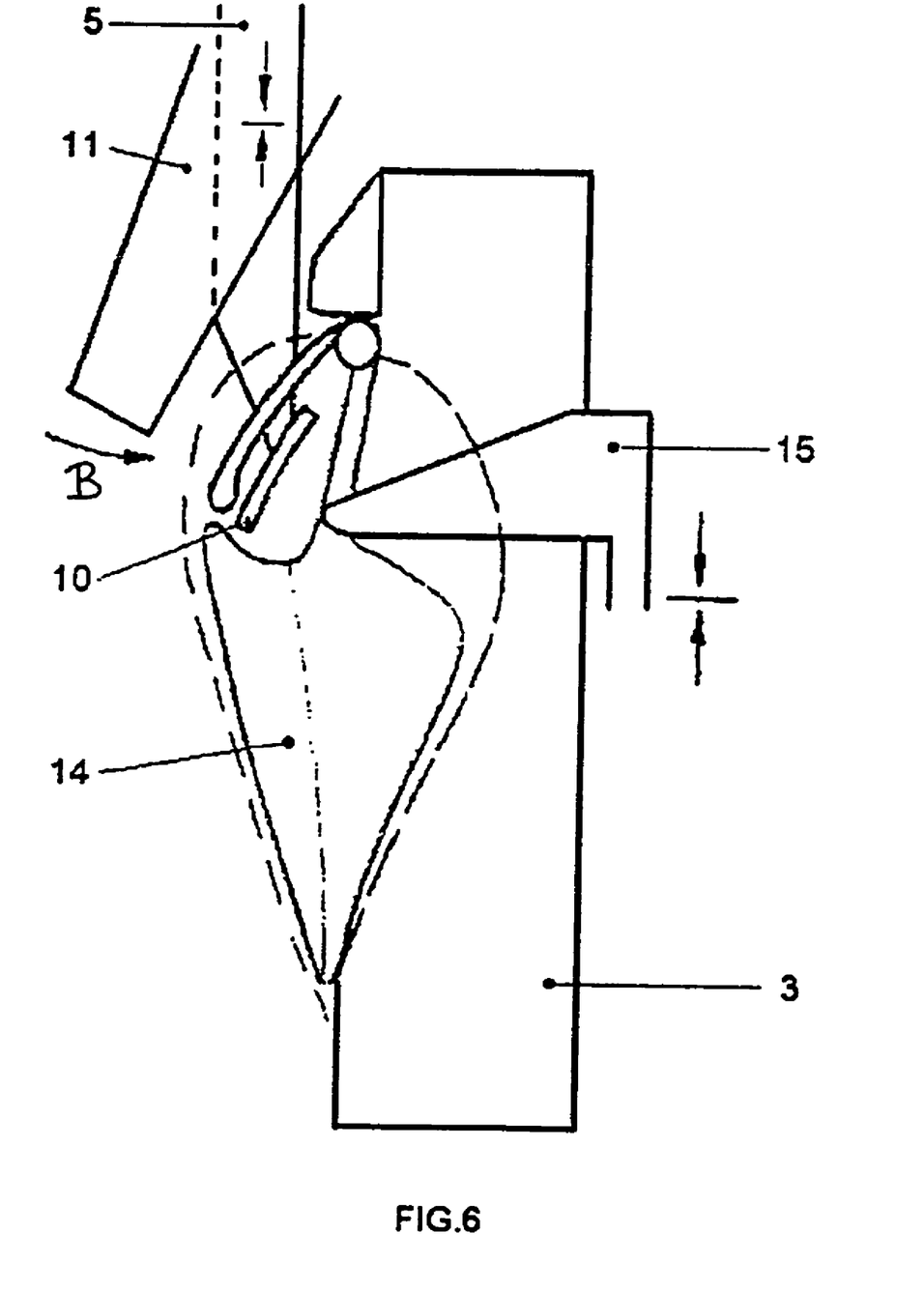
Figure 8:
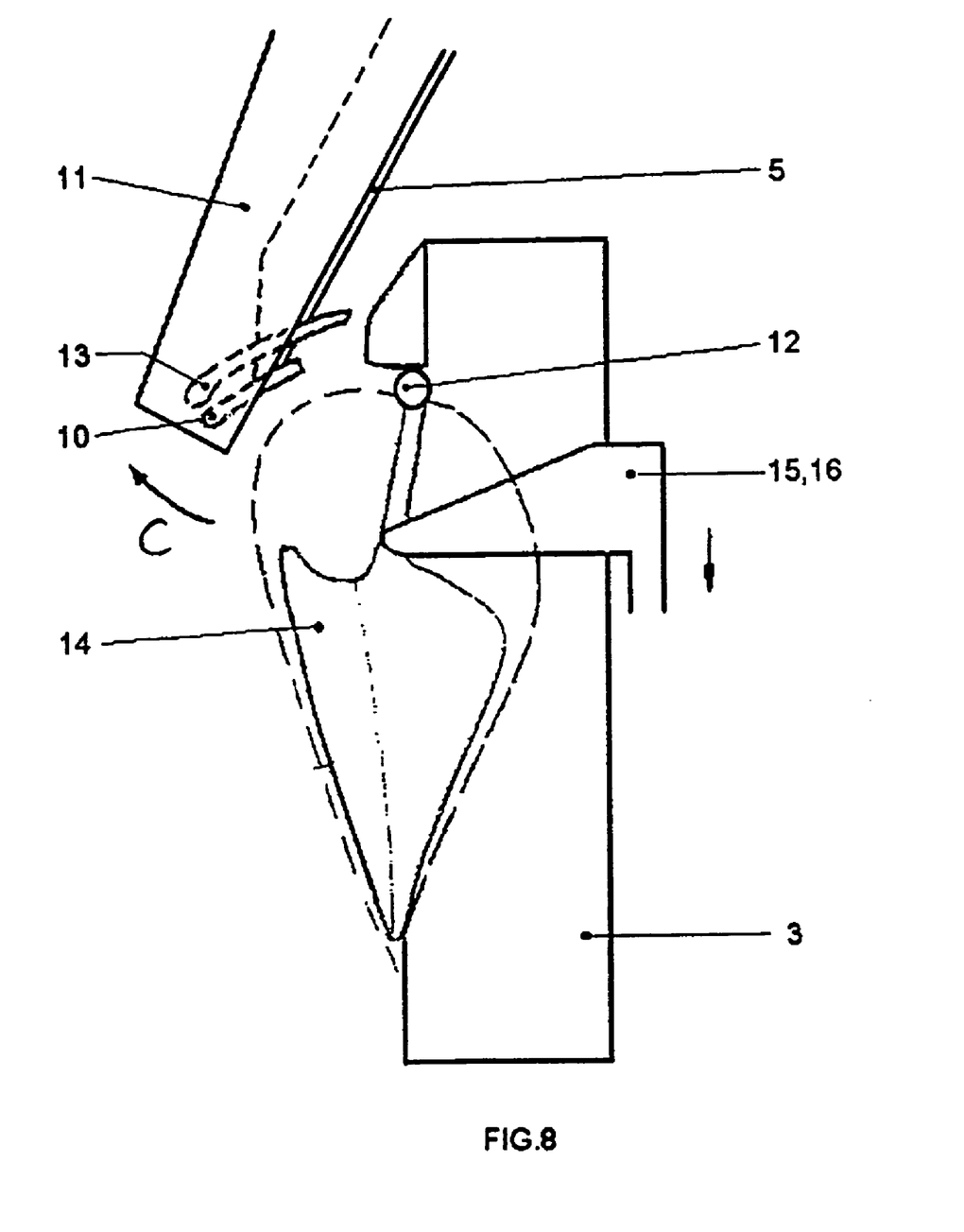

After the gouging member 10 has been repositioned from its lowest position in the direction of arrow A referred to in FIG. 5, the shearing blade 11 moves to and fro as shown in the FIGS. 6, 7 and 8; that is to say in the direction of arrows B and C. The repositioning in the direction of arrow B is a repositioning in the direction of the carrier 3 and the poultry 14 placed thereon.

It is important that when moving in the opposite direction according to arrow C, the gouging member 10 moves together with the shearing blade 11, so that the wishbone 13 is twisted out of the shoulder joint 12, and the wishbone 13 is separated from the poultry 14.

FIG. 8 schematically shows that simultaneously with, or immediately succeeding the combined movement of shearing blade 11 and gouging member 10, the scraping members 15, 16 continue their downward movement, allowing the breast fillet 14 to detach further from the carcass.

Figure 9:
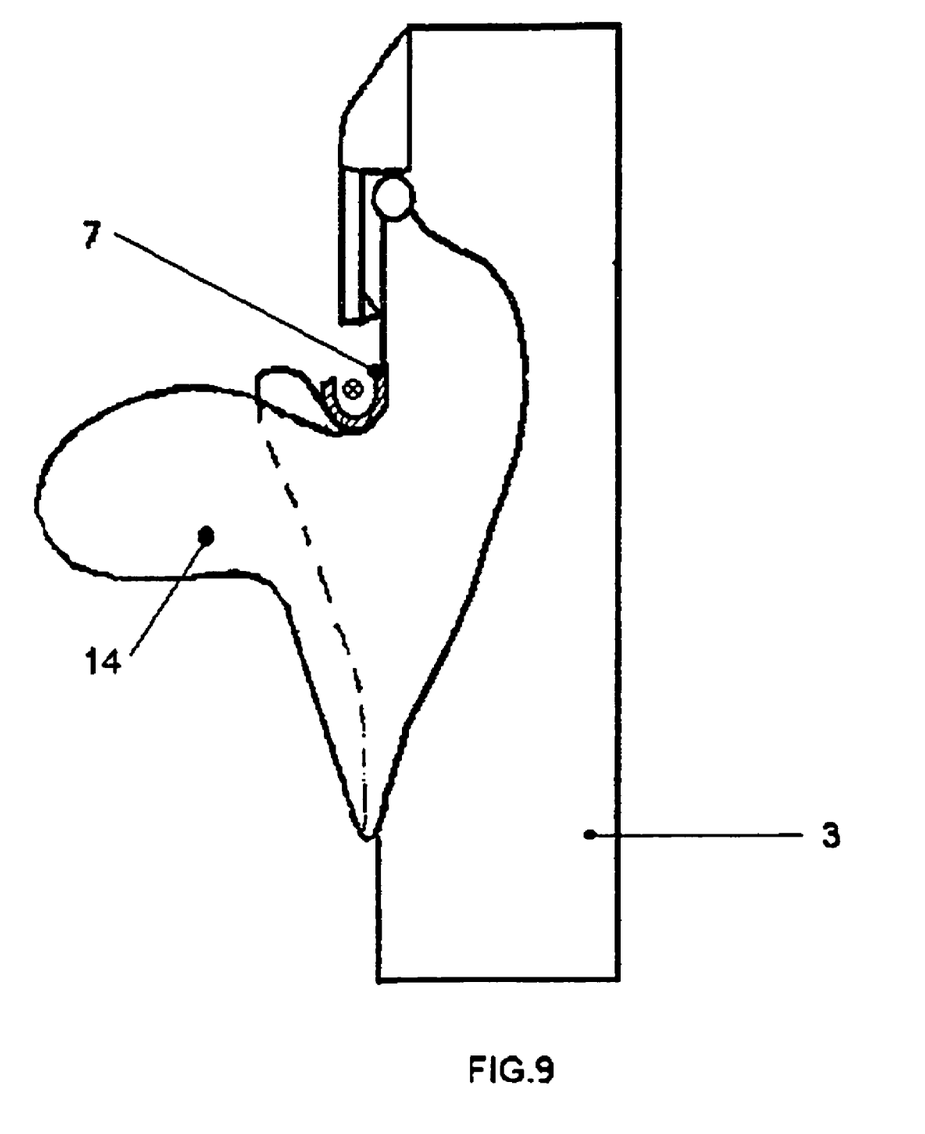
FIGS. 9 and 10: a side view and front view of the breastbone scraper as proposed in accordance with the invention.
Figure 10:
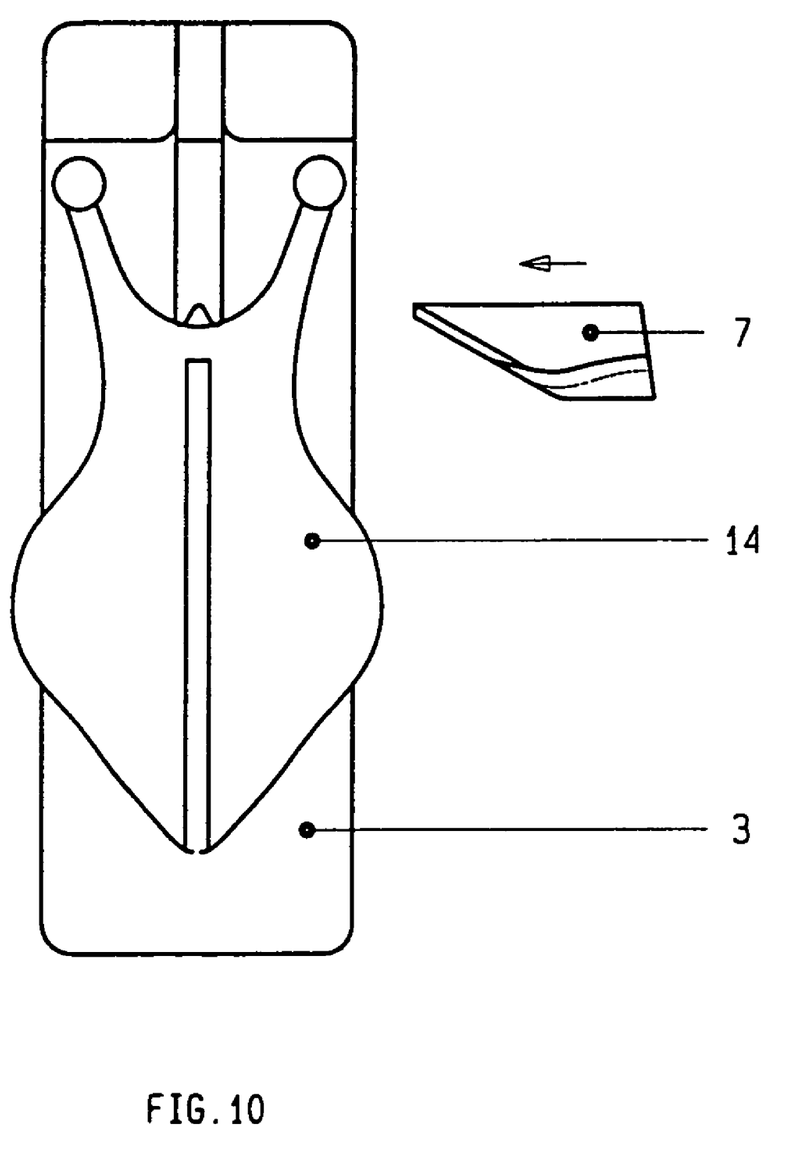

Referring again to FIG. 1, the poultry still positioned on the carrier 3 continues in the direction of the breastbone scraper 7. FIGS. 9 and 10 schematically show in side and front view, respectively, how the operation with the breastbone scraper 7 takes place.

As a result of the preceding operation, the poultry 14 is now only connected to the breastbone at the top side of the carcass, as clearly shown in FIG. 9. Due to the influence of the gravitational force said breastbone is nicely exposed for the breastbone scraper 7. As clearly shown in FIG. 10, said breastbone scraper 10 may suitably be designed as an elongated blade oriented longitudinally, in the same direction or parallel with the direction in which conveyance of the poultry takes place.

Viewed transversally, the blade 7 is rounded (see FIG. 9) so as to concur with the curve of the breastbone of the poultry 14. During this process also the carriers 3 are in the third position, that is to say the neck side of the poultry 14 is directed upward.

When it is desired to obtain two breast fillet halves, the operation using the just-discussed breastbone scraper may be omitted. Instead, an operation using a cutter for halving breast fillets may take place to produce two breast fillet halves. When passing the cutter for halving the breast fillets, the carriers 3 must be in the second position.

In a generally known manner, which requires no further explanation, it is desirable for the cutter for halving breast fillets to comprise two rotating blades that during operation are disposed sufficiently close to each other to provide incisions in the meat of the poultry at both sides of the breastbone. In this way the two breast fillet halves can be obtained by cuts in the longitudinal direction of the poultry.

It should be appreciated that modifications and variations can be made to the embodiments of the invention described herein without departing from the scope and spirit of the invention as set forth in the appended claims.

The invention claimed is:

1. A system for filleting poultry, comprising:
   a conveyor system incorporating carriers for supporting poultry carcasses, said carriers oriented vertically and coupled to a side of said conveyor system;
   processing stations disposed at locations along a path of said conveyor system wherein the poultry carcasses are conveyed through said processing stations for successive processing of parts of the poultry carcass;
   wherein said processing stations comprise at least one skinner, at least one wishbone remover, at least one fillet scraper, and either one of a breastbone scraper for removing whole fillets or a cutter for providing halved breast fillets; and
   wherein said carriers are rotatably coupled to said conveyor system and are positionable between a first position wherein the neck of a poultry carcass in said carrier is directed downward, a second position wherein the poultry carcass is oriented substantially horizontally, and a third position wherein the neck of the poultry carcass is directed upward.

2. The system as in claim 1, wherein said carriers are in said second position as the poultry carcasses are conveyed through said skinner.

3. The system as in claim 1, wherein said carriers are in said third position as the poultry carcasses are conveyed through said wishbone remover.

4. The system as in claim 1, wherein the traveling velocity of said carriers is adjustable between various of said processing stations such that the carrier velocity is optimized for different said processing stations.

5. The system as in claim 1, wherein said wishbone remover is configured to twist the poultry's wishbone out of the shoulder joints completely and without fracture of the wishbone.

6. The system as in claim 1, wherein said wishbone remover and said fillet scraper are configured to operate substantially simultaneously and in coordination with each other.

7. The system as in claim 1, wherein said breastbone scraper comprises an elongated blade disposed longitudinally parallel to a conveying direction of said carriers, said blade having a rounded cross sectional profile adapted generally to the curve of the poultry breastbone.

8. The system as in claim 1, comprising at least one said cutter, and wherein said carriers are in said second position as the poultry carcasses are conveyed through said cutter.

9. The system as in claim 8, wherein said cutter comprises two rotating blades disposed sufficiently close to each other to provide incisions in the poultry meat at both sides of the breastbone.

10. A system for filleting poultry, comprising:
    a conveyor system incorporating carriers for supporting poultry carcasses;
    processing stations disposed at locations along a path of said conveyor system wherein the poultry carcasses are conveyed through said processing stations for successive processing of parts of the poultry carcass;
    wherein said processing stations comprise at least one skinner, at least one wishbone remover, at least one fillet scraper, and either one of a breastbone scraper for removing whole fillets or a cutter for providing halved breast fillets;
    wherein said wishbone remover and said fillet scraper are configured to operate substantially simultaneously and in coordination with each other; and
    wherein said wishbone remover comprises a gouging member and a shearing blade, said gouging member insertable vertically into the poultry carcass from the top between the shoulder joints and wishbone, and said shearing blade is positionable at the breast side of the poultry and cuts the poultry underneath the wishbone and underneath a lowest position of said gouging member.

11. The system as in claim 10, wherein said fillet scraper comprises two vertically movable scraper members that are spaced so as to be positionable on respective sides of the poultry carcass.

12. The system as in claim 11, wherein operation of said fillet scraper and said wishbone remover are coordinated such that said gouging member and said scraper members make a coordinated downward movement causing a portion of the fillet to come loose from the poultry carcass while said gouging member enters the poultry carcass between the shoulder joints and wishbone.

13. The system as in claim 12, wherein at a highest operational position, said scraper members move towards each other prior to moving downward.

14. The system as in claim 12, wherein before said gouging member reaches a lowest operational position, said scraping members move upward to reduce pressure on the wishbone.

15. The system as in claim 14, wherein after reaching its lowest operational position, said gouging member moves a predetermined distance away from said respective carrier.

16. The system as in claim 12, wherein after said gouging member reaches its lowest operational position, said shearing blade moves in a to and fro path with respect to said carrier and a subsequent movement away from said carrier, said gouging member moving with said shearing blade in said subsequent movement of said shearing blade so that the wishbone is twisted out of the shoulder joints.

17. The system as in claim 16, wherein said scraping members continue their downward movement as said gouging member and shearing blade move away from said carrier is said subsequent movement.

18. The system as in claim 17, wherein said gouging member comprises a bowl shaped member to receive the wishbone.

* * * * *